United States Patent
Forster et al.

(10) Patent No.: US 7,180,423 B2
(45) Date of Patent: Feb. 20, 2007

(54) RFID DEVICES FOR ENABLING READING OF NON-LINE-OF-SIGHT ITEMS

(75) Inventors: Ian James Forster, Chelmsford (GB); Andrew W. Holman, West Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 216 days.

(21) Appl. No.: 11/028,173

(22) Filed: Dec. 31, 2004

(65) Prior Publication Data

US 2006/0145861 A1    Jul. 6, 2006

(51) Int. Cl.
*G08B 13/14* (2006.01)
(52) U.S. Cl. ............................... 340/572.7; 340/572.4; 340/572.8; 340/10.1
(58) Field of Classification Search ............. 340/572.7, 340/572.8, 572.4, 572.1, 10.1, 10.34, 10.4; 235/385
See application file for complete search history.

(56) References Cited

U.S. PATENT DOCUMENTS

| | | |
|---|---|---|
| 3,765,007 A | 10/1973 | Elder |
| 5,349,332 A | 9/1994 | Ferguson et al. |
| 5,450,492 A | 9/1995 | Hook et al. |
| 5,604,485 A | 2/1997 | Lauro et al. |
| 5,661,457 A | 8/1997 | Ghaffari et al. |
| 5,686,902 A | 11/1997 | Reis et al. |

(Continued)

FOREIGN PATENT DOCUMENTS

GB    2 360 422 A    9/2001

(Continued)

OTHER PUBLICATIONS

International Search Report for corresponding PCT/US2005/045845, completed Mar. 29, 2006 by M. Grob of the European Patent Office.

*Primary Examiner*—Toan N. Pham
(74) *Attorney, Agent, or Firm*—Tarolli, Sundheim, Covell & Tummino LLP

(57) ABSTRACT

Radio-frequency identification (RFID) apparatus and methodology enable a plurality of or all of the RFID tags in a stack of items such as cartons and boxes—including items that do not have a line of sight to a reader—to be read. An RFID system includes RFID tags and a transmission line. The RFID tags are mountable to items to be read and include an RFID circuit that generates tag energy when activated by activation energy from a reader. The transmission line carries activation energy from the reader and tag energy from the tags. The transmission line is positionable in operative or coupling proximately to a plurality of the tags when the plurality of the tags are mounted to items and when the items are stacked. Accordingly, when carrying activation energy from the reader, the transmission line couples with and thereby enables activation of the plurality of the tags. Further, when the plurality of the tags are activated and generating tag energy, the transmission line couples with and carries the tag energy from the plurality of the tags. The transmission line can be configured as an elongated adhesive tape-like structure that can be adhered across a plurality of RFID tags mounted to a plurality of items. The transmission line can also be disposed on an inter-item reading device that can be positioned between adjacent rows of stacked items.

20 Claims, 8 Drawing Sheets

U.S. PATENT DOCUMENTS

| | | | |
|---|---|---|---|
| 5,708,423 A | 1/1998 | Ghaffari et al. | |
| 5,726,630 A | 3/1998 | Marsh et al. | |
| 5,777,884 A | 7/1998 | Belka et al. | |
| 5,859,587 A | 1/1999 | Alicot et al. | |
| 5,936,527 A | 8/1999 | Isaacman et al. | |
| 6,002,344 A | 12/1999 | Bandy et al. | |
| 6,056,199 A * | 5/2000 | Wiklof et al. | 235/462.45 |
| 6,104,311 A | 8/2000 | Lastinger | |
| 6,335,685 B1 * | 1/2002 | Schrott et al. | 340/572.1 |
| 6,496,806 B1 * | 12/2002 | Horwitz et al. | 705/28 |
| 6,507,279 B2 | 1/2003 | Loof | |
| 6,714,284 B2 * | 3/2004 | Norman et al. | 356/4.01 |
| 6,724,308 B2 * | 4/2004 | Nicholson | 340/572.1 |
| 2002/0130778 A1 | 9/2002 | Nicholson | |
| 2003/0089771 A1 | 5/2003 | Cybulski et al. | |
| 2004/0135691 A1 | 7/2004 | Duron et al. | |
| 2006/0103532 A1 * | 5/2006 | Van Fleet | 340/572.1 |

FOREIGN PATENT DOCUMENTS

| | | |
|---|---|---|
| WO | WO 03/060648 A | 7/2003 |
| WO | WO 2004/114241 A | 12/2004 |

* cited by examiner

RFID DEVICES FOR ENABLING READING OF NON-LINE-OF-SIGHT ITEMS

BACKGROUND OF THE INVENTION

The present invention relates to radio-frequency identification (RFID) systems, including RFID tags and readers. The invention also relates to RFID apparatus and methodology that enable a plurality of items, such as items stacked on a pallet, to be read, including the innermost items in the stack, and even in the presence of RF intolerant material such as liquids and metals.

Automatic identification is the broad term applying to a host of technologies that are used to help machines identify items or objects such as cartons, boxes, bottles, and so on. Automatic identification is often coupled with automatic data capture. Therefore, companies wanting to identify items are able to capture information about the items, to store the captured information in a computer, and to retrieve selectively the information from the computer for a variety of useful purposes, all with minimal human labor.

One type of automatic identification technology is radio-frequency identification (RFID). Radio-frequency identification is a generic term for technologies that use radio waves to automatically identify items. There are several conventional methods of identifying items using RFID, the most common of which is to store a serial number (and other information, if desired) that identifies a product on a microchip that is attached to an antenna. The chip and the antenna together define an RFID transponder circuit. The antenna enables a remote reader that has a transceiver to communicate with the chip, and enables the chip to transmit identification information back to the reader when actuated to do so by the reader. The reader converts the radio waves returned from the RFID tag into a form that can then be utilized by a computer.

A conventional RFID system consists of a tag (including a chip with a antenna) and a reader (sometimes called an interrogator) with an antenna. The reader sends out electromagnetic waves that form a magnetic field when coupled with the antenna on the RFID tag. A passive RFID tag draws power from this magnetic field and uses the power to drive or activate the chip. The chip then modulates the waves that are sent back to the reader, and the reader converts the returned waves into digital information.

There are generally two types of RFID tags: active and passive. An active RFID tag utilizes a battery to power the chip and to transmit a signal to a reader (similar to a cell phone transmitting signals). A passive tag does not have a battery but rather is powered by the electromagnetic waves that induce a current in the antenna of the tag. A semi-passive tag uses a battery to power the chip but communicates by drawing power from electromagnetic waves from the reader.

Similar to a radio tuning to different frequencies, RFID tags and readers are tuned to the same frequency to communicate. RFID systems use many different frequencies, but the most common frequency ranges utilized in RFID systems are low-frequency (about 125 KHz), high-frequency (13.56 MHz), and ultra-high frequency or UHF (about 900 MHz). Microwaves, which have a frequency of about 2.45 GHz, are also used in some applications.

The distance at which an RFID tag can be read is known as the read range. The read range of a passive tag depends on a number of factors: the frequency of operation, the power of the reader, and interference from metal items or other RF devices. In general, low-frequency tags have a read range of about one foot; high-frequency tags have a read range of about three feet; and UHF tags have a read range of about 20 feet. Where longer read ranges are needed, an active tag with a read range of 300 feet or more can be used.

One of the desired applications of RFID tags is to track and inventory goods in a supply chain, particularly at high volumes such as a plurality of items stacked on a pallet on a loading dock or in a warehouse. One of the inherent difficulties in this application is ensuring that all of the RFID tags associated with all of the items in the stack are read, including the inner items of the stack that are obscured from view by the outer items of the stack. For example, if the stack of items is a five-by-five layer stacked five layers high (i.e., 125 items total), then the user would want to ensure that all 125 RFID tags are read, even those tags mounted to items located in the center of the stack.

The effectiveness of reading tags located in the center of a stack may be impaired by the presence of materials that are not particularly conducive to RF reading. More specifically, while all materials interact with RF waves to varying degrees, RF waves are able to travel through most non-metallic materials, so that RFID tags can be embedded in packaging or encased in protective plastic for weatherproofing and durability while still being readable. However, RF waves particularly reflect off of conductive materials such as metals and are particularly absorbed by certain other materials, such as water, fat, sugar, and protein at higher frequencies—absorptive materials that are commonly found in food items shipped in cartons. These characteristics make tracking metal products or those with high water content problematic. In addition, reading a stack of items with RFID tags, particularly items located in the center of the stack or items that may contain highly conductive or absorptive materials, is also problematic.

In view of the foregoing, there is a need in the art for RFID technology that enables a plurality of or all of the RFID tags in a stack of items to be read. The present invention satisfies this need.

BRIEF SUMMARY OF THE INVENTION

In accordance with exemplary embodiments of the present invention, radio-frequency identification (RFID) apparatus and methodology are provided that enable the RFID tags in a stack of RFID-tagged items, such as shipping and storage containers, cartons, and boxes, including items that are RF obscured or do not have a direct line of sight to an RFID reader, to be read effectively by the reader.

According to one aspect of the invention, an RFID system for reading a plurality of stacked items includes a plurality of RFID tags and a transmission line. Each of the RFID tags is mountable to one of the items and includes an RFID circuit that generates tag energy when activated by activation energy from a reader. The transmission line carries activation energy from the reader and tag energy from the tags. In addition, the transmission line is positionable in operative or coupling proximately to a plurality of the tags when the plurality of the tags are mounted to items and the items are stacked. Accordingly, when carrying activation energy from the reader, the transmission line couples with and thereby enables activation of the plurality of the tags. Further, when the plurality of the tags are activated and generating tag energy, the transmission line couples with and carries the tag energy from the plurality of the tags. In view of the positioning of the transmission line in coupling proximity to the plurality of RFID tags, the stack of RFID-tagged items can be read, even those items that are RF obscured and do not have a direct line of sight to the reader.

In a number of embodiments, the transmission line can be configured as an elongated adhesive tape-like structure that can be adhered across a plurality of RFID tags mounted to a plurality of items. In other embodiments, the transmission line can be disposed on an inter-item reading device that can be positioned between adjacent rows of stacked items. In still other embodiments, the transmission line can be connected to an antenna for receiving and radiating activation and tag energy, respectively, and can include one or more amplifiers for amplifying the activation and tag energy.

Other features and advantages of the present invention will become apparent to those skilled in the art from a consideration of the following detailed description taken in conjunction with the accompanying drawings.

DETAILED DESCRIPTION OF THE INVENTION

Figure 1:
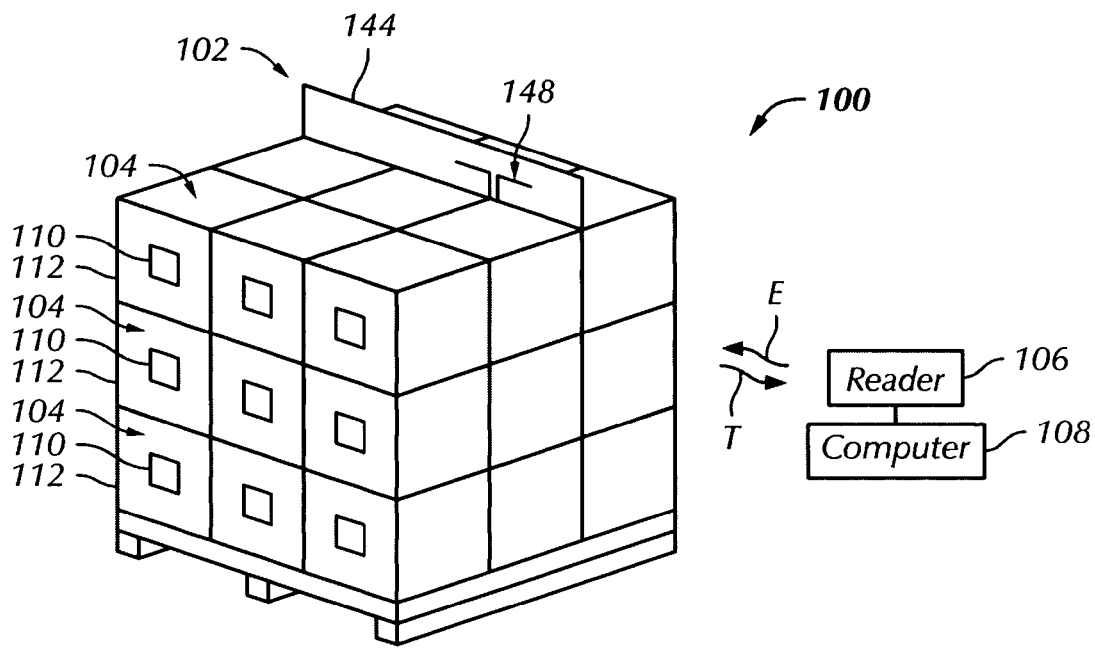
FIG. 1 illustrates an exemplary embodiment of a system for reading a load of stacked RFID-tagged items according to the invention.
Figure 2:
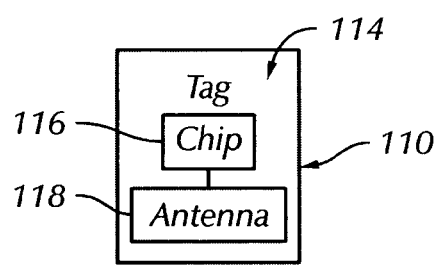
FIG. 2 is a block diagram of an exemplary embodiment of an RFID tag according to the invention.

Referring more particularly to FIG. 1 of the drawings, a radio-frequency identification (RFID) system 100 enables the performance of a 100% read of a palletized load 102 that includes a plurality of RFID-tagged items 104 such as an object, box, carton, case, bottle, container, drum, or the like. In a number of embodiments, the system 100 may include a reader or interrogator 106 and a computer 108. The reader 106 transmits and receives radio-frequency (RF) energy to and from the load 102, and passes information associated with the load 102 and carried by the energy received from the load to the computer 108. The computer 108 in turn may be connected to, for example, a network, an output device, and/or a database for further processing of the information.

Figure 3:
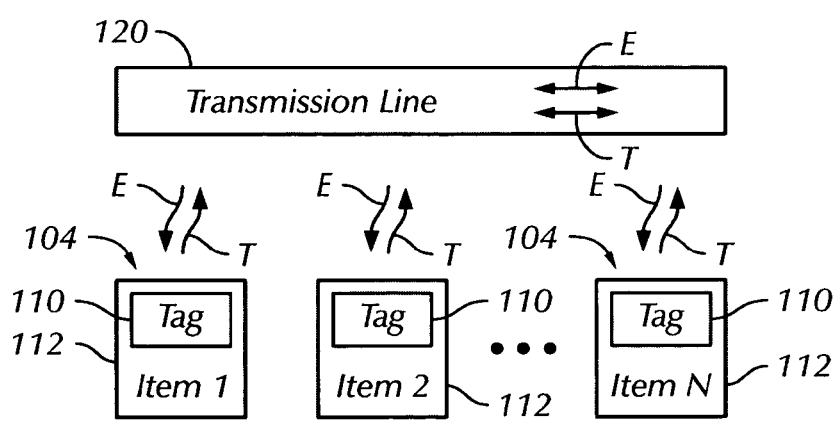
FIG. 3 schematically illustrates the operating principles of a system for reading a load of stacked RFID-tagged items.

The system 100 includes a plurality of RFID tags 110 that are respectively mounted to each of a plurality of items 112. Each of the tags 110 includes an RFID circuit 114 that, in turn, may include a chip 116 operatively coupled to an antenna 118, as shown in FIG. 3. When activated by activation energy E from the reader 106, the RFID circuits 114 of the tags 110 each generates tag energy T which is then received by the reader 106 for processing. When stacked together, a number of the RFID-tagged items 104 may not be in a line of sight of the reader 106 and, therefore, are RF obscured and not able to be activated by the reader. In addition, the tags 110 of the items 104 may be spatially separated from each other. The system 100 disclosed herein enables such items 104 with tags 110 to be activated and read without being in line of sight of the reader 106.

FIG. 3 illustrates schematically the principles of the RFID system 100 in which a plurality of RFID tags 110 are respectively mounted each of to a plurality of items 112. According to a number of embodiments, a transmission line 120 can be disposed in operative or coupling proximity to at least a number N of the tags 110. The transmission line 120 is configured to carry activation energy E from the reader 106 and tag energy T from the tags 110. Accordingly, when carrying activation energy E and when in coupling proximity with a tag 110, the transmission line 120 couples with the RFID circuit 114 of the tag 110, thereby enabling the activation of the circuit 114 and the generation of tag energy T. Similarly, when a tag 110 is activated and generating tag energy T, the transmission line 120 couples with the RFID circuit 114 of the tag 110 and carries the generated tag energy.

For the purposes of this description, the term "coupling proximity" is used to describe the physical relationship between the transmission line 120 and the RFID circuit 114. Coupling proximity may be dependent upon a number of parameters, including distance, the strength of the tag and activation energy signals (i.e., signal strength) and the corresponding magnetic and/or electric field strength, the magnetic permeability and the electrical permittivity of any materials associated with the tags 110 and the transmission line 120, the design and the orientation of the antenna 118, and so on. In a number of embodiments, coupling proximity may indicate that the transmission line 120 is in physical contact with the tags 110. In other embodiments, coupling proximity may indicate that the transmission line 120 and the tags are physically separated but that the other parameters sufficiently and operatively overcome the physical separation and ensure effective coupling between the transmission line 120 and the tags 110.

Also for the purposes of this description, the term "line of sight" is used to describe not only a spatial relationship between a reader 106 and a tag 110, i.e., an optical line of sight, but also an RF relationship between a reader 106 and a tag 110. More specifically, although a tag 110 may not be in an optical line of sight with a reader 106, a clear RF communication channel may nevertheless exist between the two such that the tag 110 may still be read by the reader 106. For example, if the optical line of sight with a reader 106 is blocked by low-absorption material such as dry cereal products, the RF energy from the reader 106 may still pass through the low-absorption material to activate the tag 110, with the resulting tag energy also passing back through the low-absorption material to reach the reader 106. Accordingly, a tag 110 may not be in an optical line of sight communication with a reader 106 but may still be in an RF line of sight communication therewith. The RF line of sight communication can be affected by the distance between a reader 106 and a tag 110, geometric effects of the tag 110 (e.g., "null" points where reception is poor), and absorptive qualities of any intervening materials.

Therefore, for the purposes of this description, the state of being "in a line of sight" communication is defined as the ability of a tag 110 to be read by a reader 106, regardless of whether the tag 110 is in a true optical line of sight with the reader 106 or not, and the state of being "not in a line of sight" communication is defined as the inability of a tag 110 to be read by a reader 106. Expanding on these definitions further, an item that is in a line of sight of a reader may also be described as an "RF-communicative" item, and an item that is not in a line of sight of a reader may also be described as an "RF-obscured" item.

Figure 4:
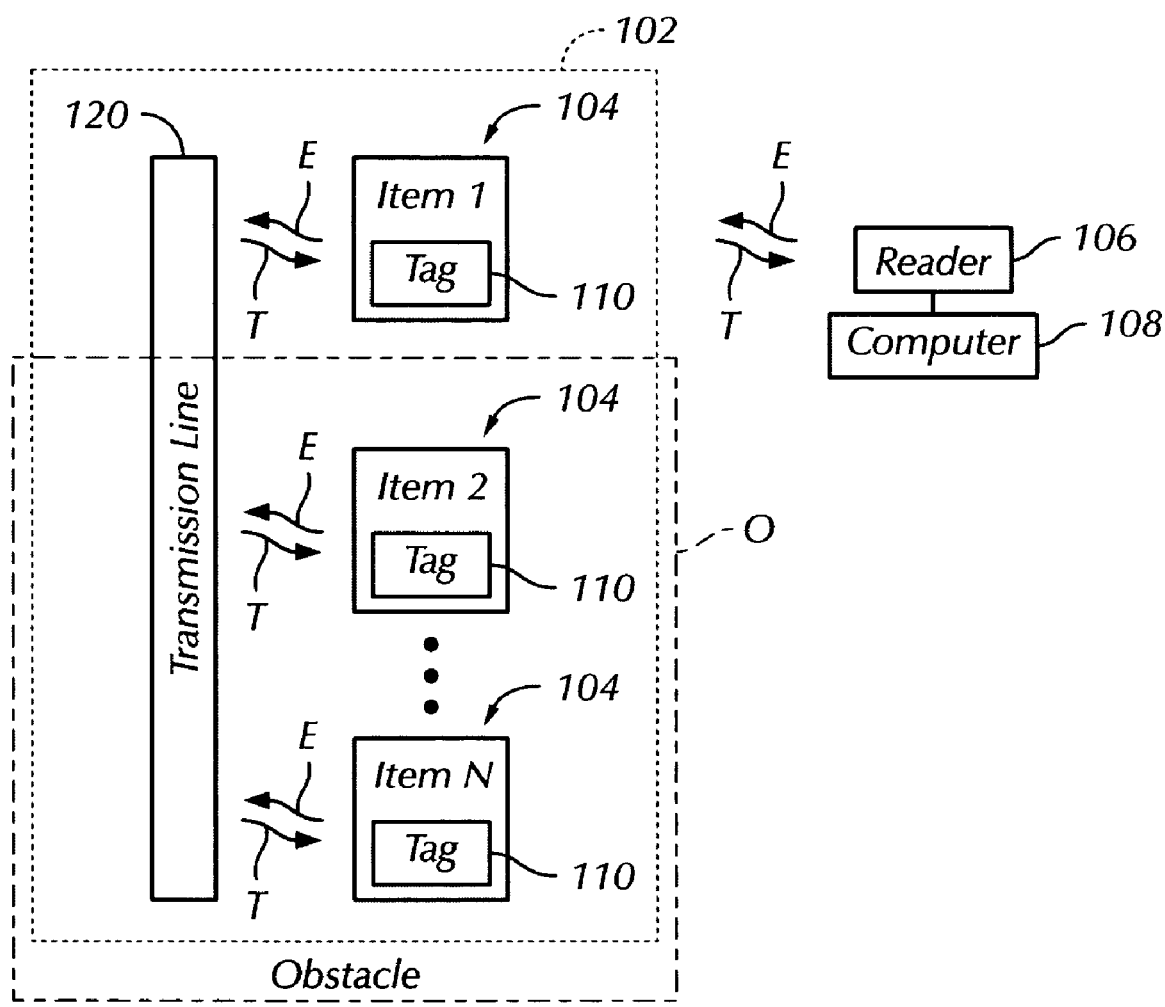
FIG. 4 schematically illustrates the operating principles of a system for reading a load of stacked RFID-tagged items in which at least one of the items is in the line of sight of an RFID reader.

This coupling with a plurality of tags 110 by the transmission line 120 enables the principles of the invention to be applied in a number of ways to read a stack 102 of RFID-tagged items 104. For example, with reference to FIG. 4, the stack 102 of RFID-tagged items 104 is shown with a number of the items being blocked, e.g., by an obstacle O from being in line of sight with the reader 106. More specifically, in this embodiment ITEM 1 is an RF-communicative item and has a line of sight with the reader 106, while ITEM 2 . . . ITEM N are RF-obscured items and do not have a line of sight. Accordingly, ITEM 1 is able to receive activation energy E from the reader 106 and to radiate tag energy T for receipt by the reader 106, while ITEM 2 . . . ITEM N are not able to receive activation energy E from the reader 106 directly.

To activate RF-obscured items 104, the transmission line 120 is positioned in coupling proximity with the tag 110 of an RFID-tagged item 104 having a line of sight with the reader 106, i.e., RF-communicative ITEM 1. The transmission line 120 is also positioned in coupling proximity with the RF-obscured ITEMS 2 . . . N. Accordingly, when the reader 106 transmits activation E, the RFID circuit 114 of the tag 110 mounted to the RF-communicative ITEM 1 is activated and generates tag energy T. In addition, the transmission line 120 couples with the activated RFID circuit 114 of ITEM 1 and, in turn, carries the activation energy E to and thereby couples with the RFID circuits 114 of the tags 110 of the RF-obscured ITEMS 2 . . . N. In turn, the transmission line 120 carries the tag energy T from the now-activated RFID circuits 114 of the RF-obscured ITEMS 2 . . . N, which tag energy T couples with the RFID circuit 114 of the RF-communicative tag 110 of ITEM 1 . The tag energy T from the RFID circuits 114 of each of the ITEMS 1 . . . N is then radiated back to the reader 106 by the RFID circuit 114 of ITEM 1.

Figure 5:
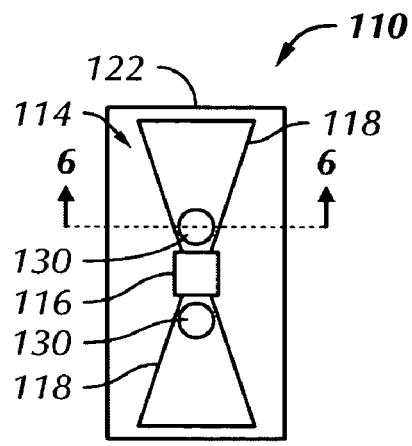
FIG. 5 illustrates another exemplary embodiment of an RFID tag of the invention.
Figure 6:
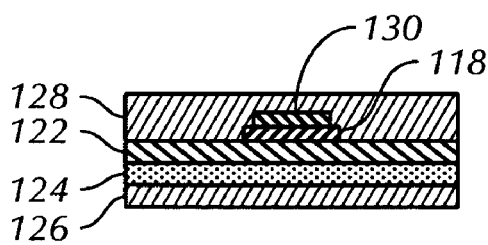
FIG. 6 is a cross-sectional view of the RFID tag of FIG. 5 taken along line 6—6 thereof.

With additional reference to FIGS. 5 and 6, in a number of embodiments, the tags 100 may include a substrate 122 on which the RFID circuit 114 is disposed. In some of the embodiments as particularly shown in FIG. 6, the substrate 122 may include an adhesive layer 124 with a release liner 126. In addition, a protective coating 128 may be applied over the RFID circuit 114. To enhance coupling with the transmission line 120, the RFID circuit 114 may include one or more dielectric elements 130 disposed on or over the antenna or antennas 118 of the tag. The dielectric elements 130 may include a material having a high dielectric constant to increase the coupling with the transmission line.

Figure 7:
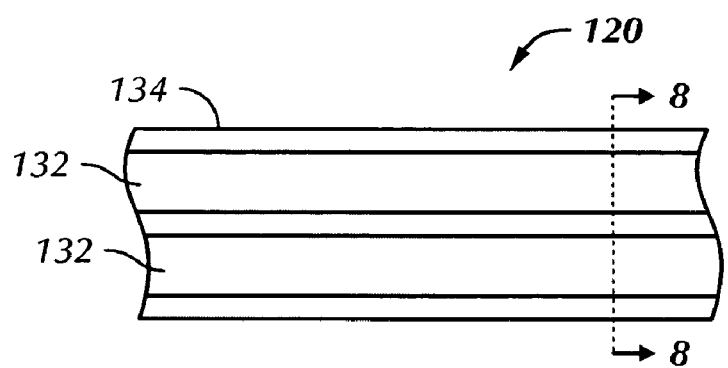
FIG. 7 is a fragmentary plan view of a transmission line with a pair of conductors.
Figure 8:
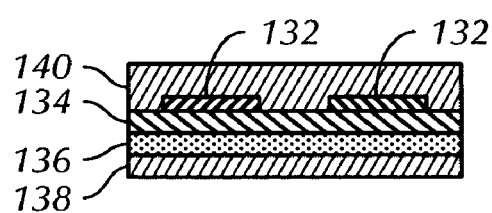
FIG. 8 is a cross-sectional view of the transmission line of FIG. 7 taken along line 8—8 thereof.
Figure 9:
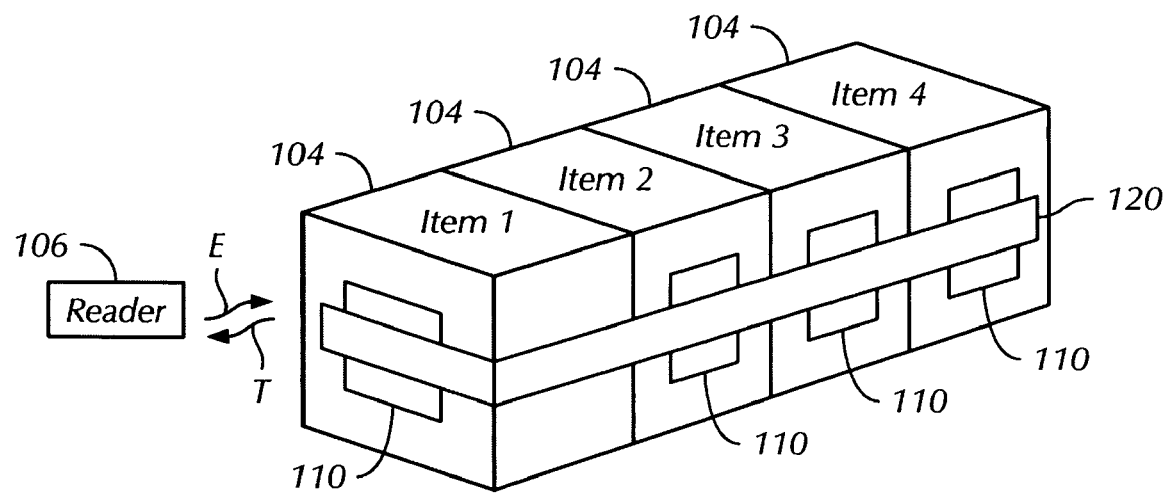
FIG. 9 is a perspective view of another exemplary embodiment of a system for reading a load of stacked RFID-tagged items according to the invention.

Referencing FIGS. 7 and 8, in a number of embodiments, the transmission line 120 may include a pair of conductors 132 disposed on a substrate 134, such as a piece of sheet material, e.g., paper or plastic. In some of the embodiments, the substrate 134 may include an adhesive layer 136 with a release liner 138. Accordingly, in substantially elongated embodiments, such as shown in FIG. 9, the transmission line 120 may be configured essentially as a conductive adhesive tape that may be applied over a plurality of the tags 110 mounted to cartons 104, thereby effectively coupling the tags together. In addition, the transmission line 120 may include a protective coating 140 applied over the conductors 132 on the substrate 134.

Figure 9A:
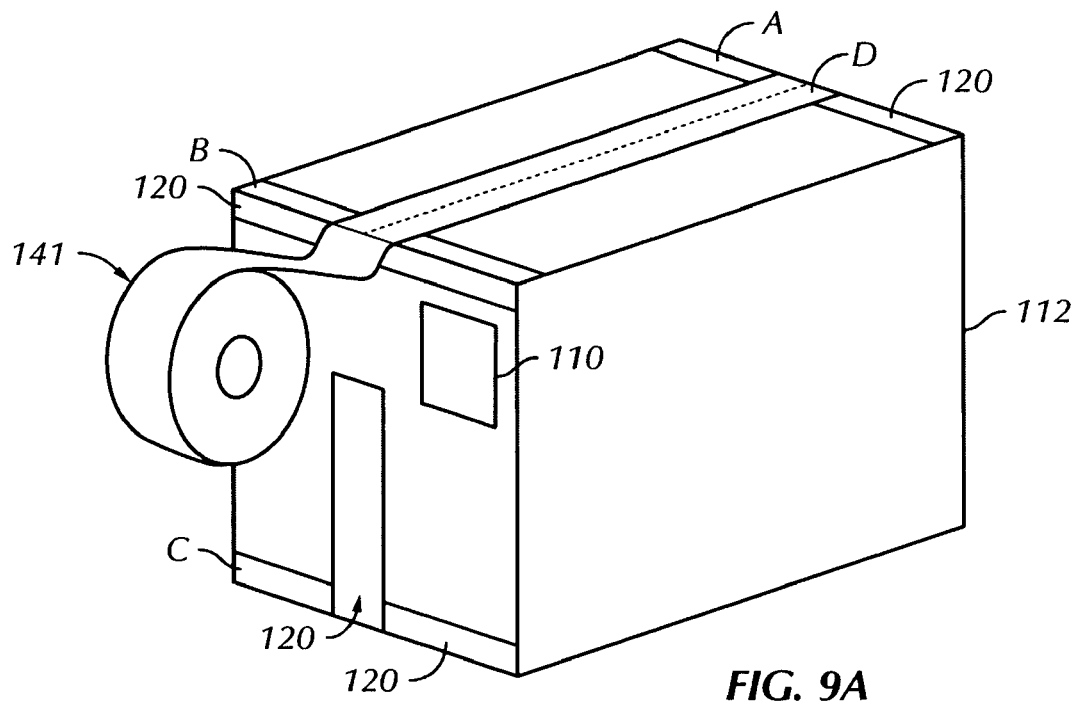
FIG. 9A is a perspective view of a conductive transmission line being applied to a carton according to an exemplary embodiment of the invention.

In other embodiments as shown in FIG. 9A, the adhesive transmission line 120 may be configured as a roll of conductive adhesive tape 141 with a cross-sectional view substantially represented in FIG. 8. In these embodiments, the adhesive transmission line 120 can be utilized much like conventional strapping or packing tape to seal the edges of a box or carton 112 as shown by the segments A, B, and C, and a center flap, as shown at segment D. An RFID tag 110 adhered to a side of the carton 112 within coupling proximity of at least one of the segments of adhesive transmission line 120 may then be activated by activation energy E carried by the transmission line segments. When stacked with other cartons 112 such as shown in FIG. 1, the segments of the conductive transmission line 120 can couple with the segments of conductive transmission line 120 on an adjacent carton. Accordingly, the activation and tag energy E and T can be propagated throughout the stack 102 by adjacent and coupling segments of the transmission line 120.

Figure 10:
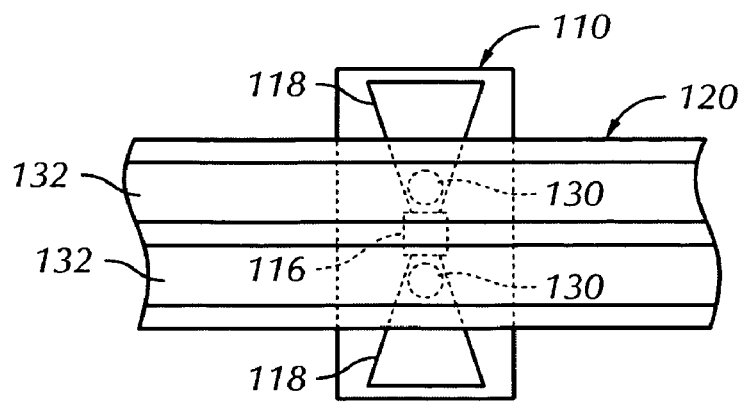
FIG. 10 illustrates a spatial relationship between an RFID tag and a transmission line when in coupling proximity to each other.

As shown in FIG. 10, when positioned in coupling proximity with the tags 110, the conductors 132 of the transmission line 120 are spatially juxtaposed with at least the antennas 118 and, in some of the embodiments, with the dielectric elements 130. In embodiments in which the transmission line 120 is not used with the tags 110, the dielectric elements 130 do not affect the operation of the antennas 118. However, when the transmission line 120 is in coupling proximity with the tag 110, the dielectric elements 130 effectively create a high-capacitance bridge with the conductors 132. This effect allows the conductors 132 to be spatially juxtaposed over a small area of antenna 118 (e.g., near the RFID chip 116 as shown in FIG. 10; as opposed to the larger area of antenna 118 near outer edges of the tag 110) while still ensuring an effective RF coupling.

As shown in the application example in FIG. 9, the adhesive tape-like embodiment of the transmission line 120 enables a plurality of RFID-tagged cartons 104 to be read at a 100% rate. As shown, ITEM 1 is in a line of sight with a reader 106, while the other ITEMS 2, 3, and 4 are not. The flexible substrate 134 and adhesive 136 enable the transmission line 120 to be adhered to the tags 110 of the items 104, from ITEM 1 to ITEM 4, and even bending around a corner of ITEM 1. Accordingly, the activation energy E from the reader 106 is carried by the transmission line 120 to each of the tags 110 for their activation, and, in turn, the tag energy T from each of the activated tags 110 is carried by the transmission line 120 back to the tag 110 that is in the line of sight of the reader 106, and thereby radiated back to the reader 106.

Figure 11:
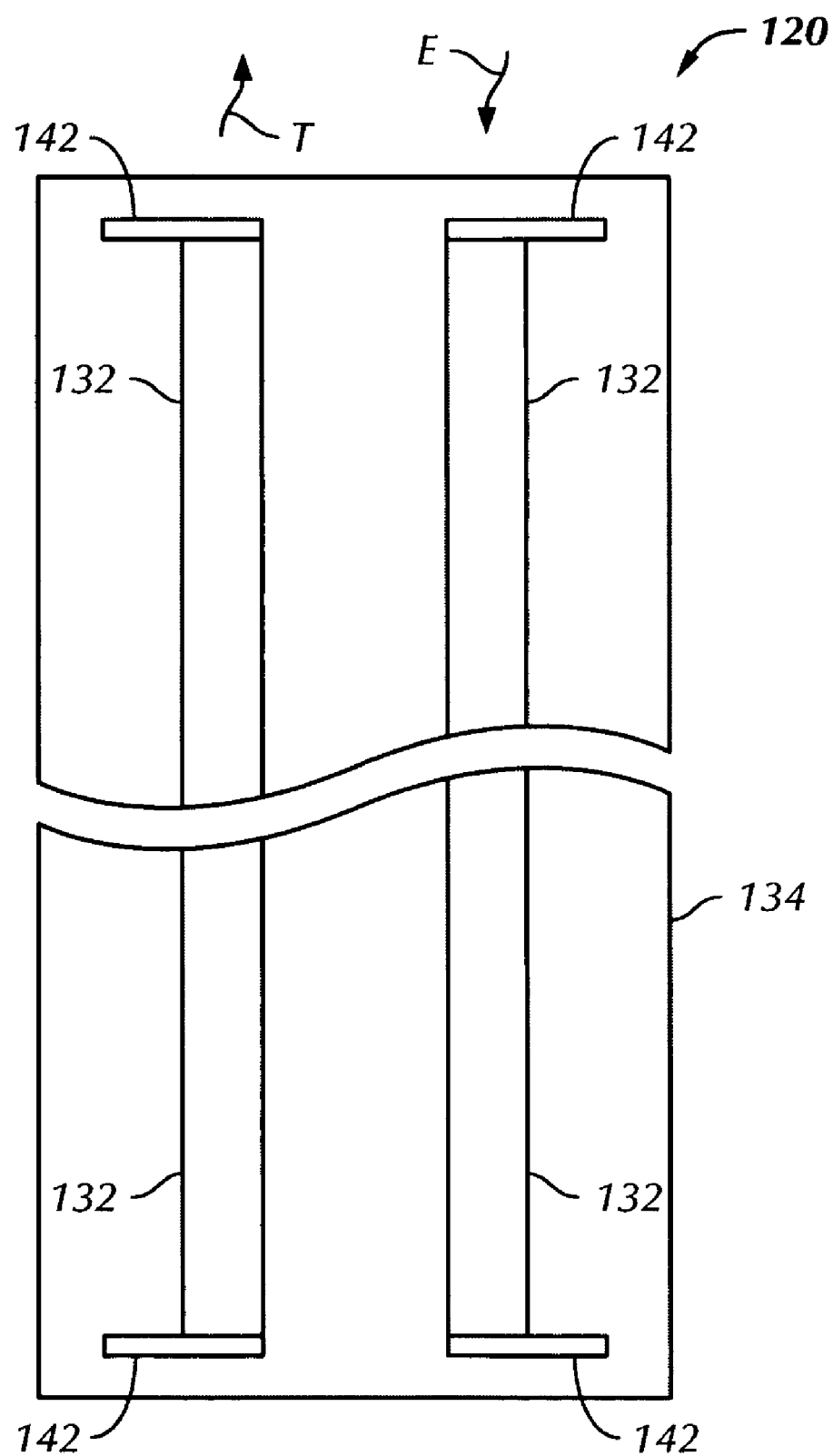
FIG. 11 is a fragmentary plan view of another exemplary embodiment of a transmission line of the invention.

In addition to coupling with the RF-communicative tag 110 for radiation of the tag energy T back to the reader 106, in other embodiments, the transmission line 120 may include a plurality of antenna elements 142 electrically connected to ends of the conductors 132, as shown in FIG. 11. In these embodiments, the transmission line 120 is able to receive activation energy E directly from the reader 106 and radiate tag energy T from the activated tags 100 back to the reader 106.

Figure 12:
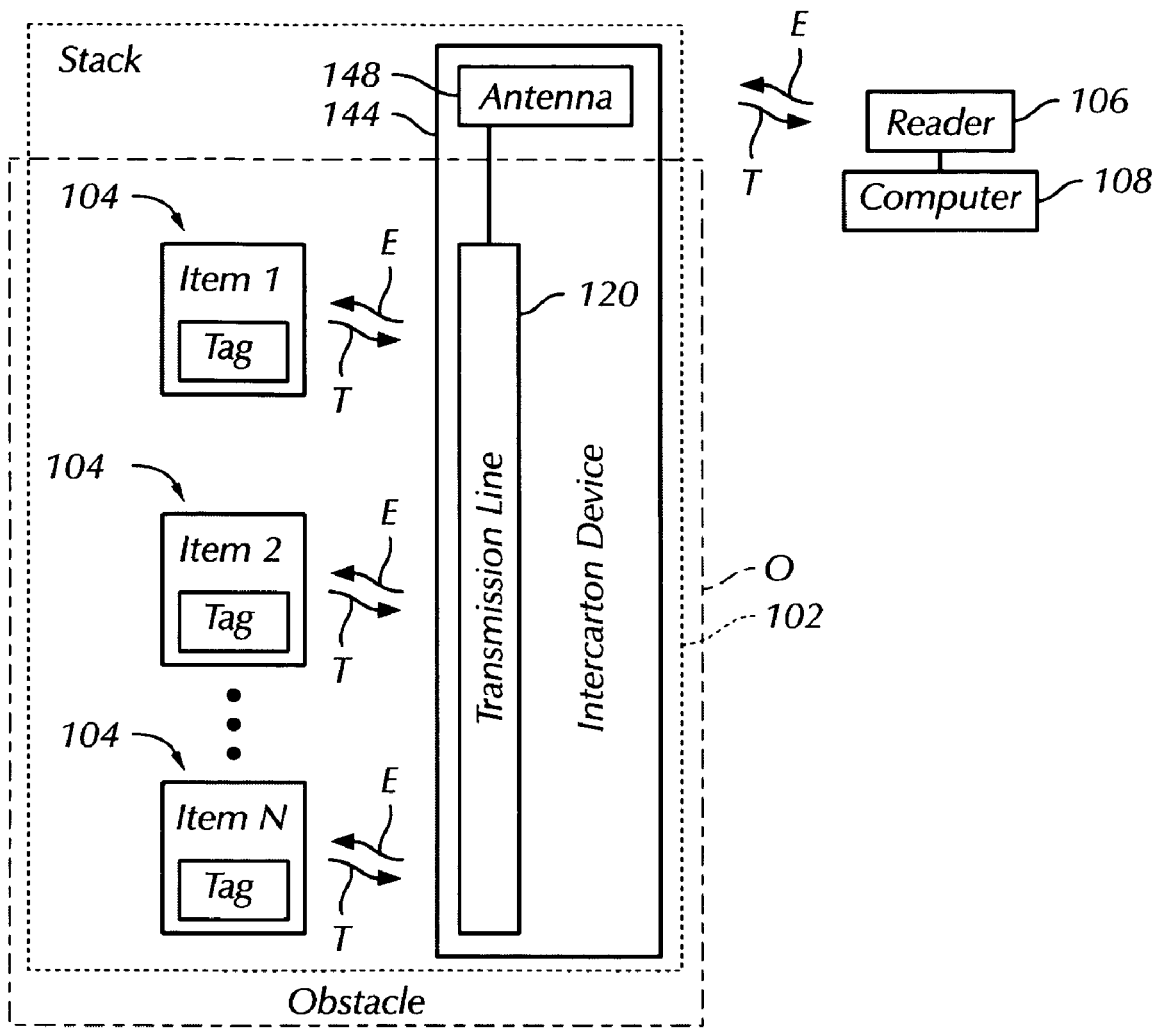
FIG. 12 schematically illustrates the operating principles a system in accordance with another exemplary embodiment of the present invention for reading a load of stacked RFID-tagged items in which none of the items has a line of sight with a reader.
Figure 13:
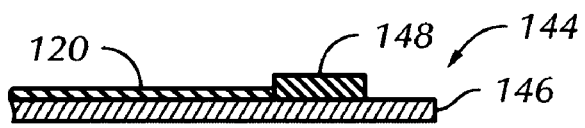
FIG. 13 is a fragmentary cross-section view of an exemplary embodiment of an inter-item reading device in accordance with the present invention.

Another application of the principles of the coupling transmission line 120 is shown in FIG. 12. In this example, none of the items 104 has a line of sight with the reader 106. To activate the tags 110 (i.e., all are RF-obscured items), an inter-item reading device 144 can be inserted between adjacent rows of stacked items 104, as shown in FIG. 1. In embodiments such as shown in FIG. 13, the inter-item reading device 144 includes the transmission line 120 disposed on a substrate 146, for example, a substantially rigid or inflexible piece of sheet material, such as cardboard, pressboard, or the like. The inter-item reading device 144 may also include a stack antenna 148 connected to the transmission line 120. The stack antenna 148 is positioned on the substrate 146 so that when positioned in a stack of items 104, the stack antenna 148 can be located at a point that is in a line of sight with the reader 106, which is shown in FIGS. 1 and 12.

When the inter-item reading device 144 is inserted between adjacent rows of stacked items 104, the transmission line 120 is in coupling proximity with at least a number of the tags 110, and the stack antenna 148 receives the activation energy E from the reader 106, which is then carried by the transmission line 120, and the RFID circuits 114 of the coupled tags may then be activated as described above.

Figure 14:
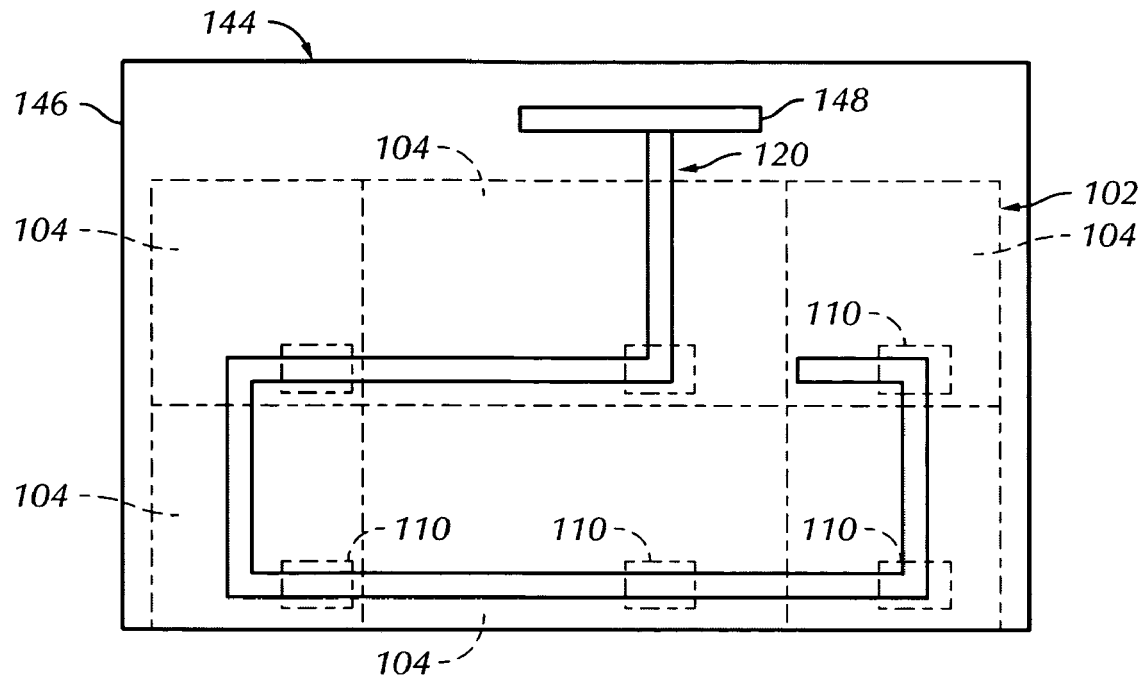
FIG. 14 illustrates another exemplary embodiment of an inter-item reading device that is able to read a plurality of RFID tags.

As illustrated in FIG. 14 with the items 104 shown in phantom line for clarity, the transmission line 120 may be disposed on the substrate 146 in a predetermined configuration based on the known location of the tags 110 when disposed on a known size and shape of item 104. Accordingly, for substantially similar stacks 102 of items 104, the inter-item reading device 144 may be used repeatedly. This is particularly advantageous in warehouse applications in which pallets of stacked cartons are repeatedly moved through a loading dock equipped with an RFID reader system.

Figure 15:
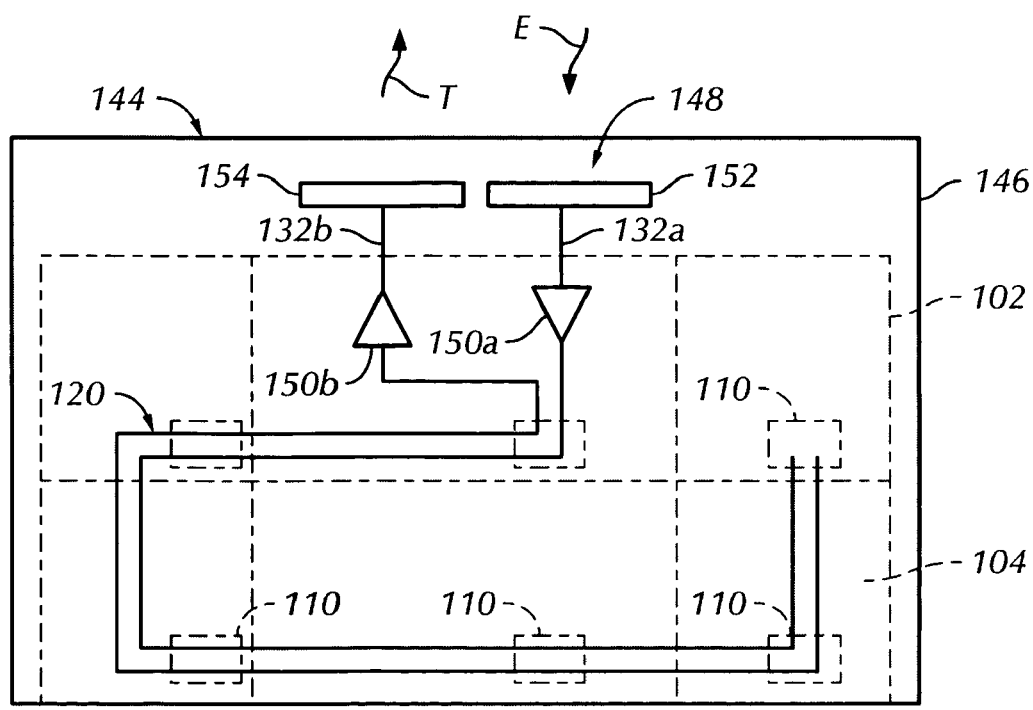
FIG. 15 illustrates another exemplary embodiment of an inter-item reading device that is able to read a plurality of RFID tags.

In a number of embodiments such as shown in FIG. 15, the inter-item reading device 144 may include one or more amplifiers 150 for amplifying the activation energy E and/or the tag energy T. More specifically, the stack antenna 148 may include a receive section 152 for receiving activation energy E from a reader and a radiate section 154 for radiating tag energy T from the activated tags 110. The transmission line 120 may include a pair of conductors 132 that are each positionable in coupling proximity with a plurality of tags 110. One of the amplifiers 150a may be disposed downstream of the receive section 152 to amplify the activation energy E prior to being carried by the conductor 132a to the tags 110. The other amplifier 150b may be positioned at or near the radiate section 154 to amplify the tag energy T prior to radiation.

Figure 16:
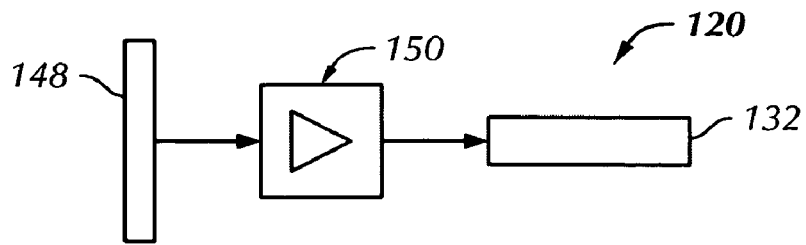
FIG. 16 is a schematic view of another exemplary embodiment of a transmission line with an amplifier and an antenna.

As shown in FIG. 16, the transmission line 120 may include a single amplifier 150 positioned at or near the stack antenna 148 for amplifying the activation energy E to enhance coupling between the conductor 132 and the RFID circuits 114. This amplifier embodiment may also be implemented in the embodiment of the transmission line 120 illustrated in FIG. 11.

Figure 17:
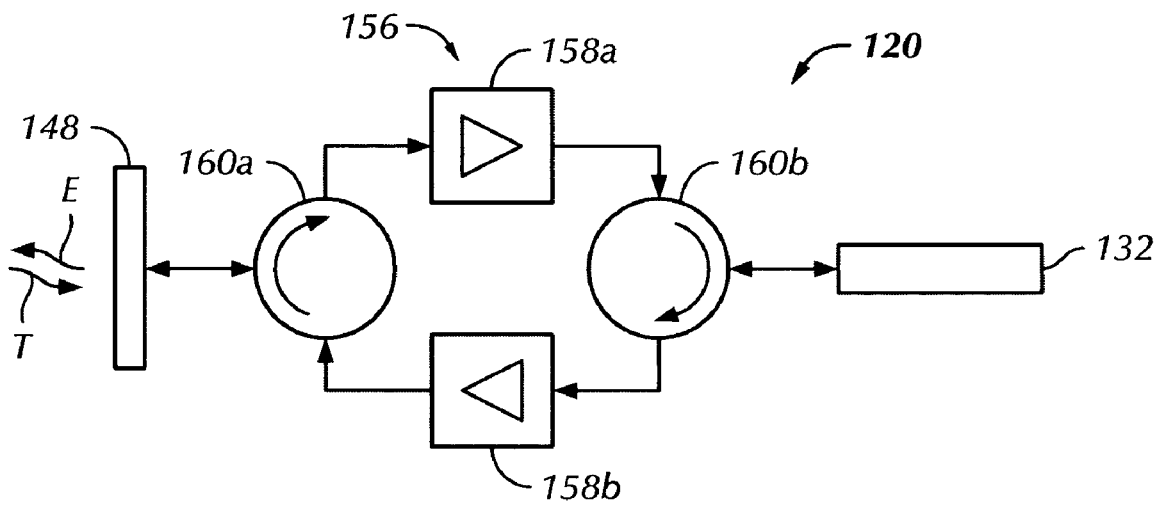
FIG. 17 is a schematic view of another exemplary embodiment of a transmission line with an amplifier section and an antenna.

In still other embodiments as shown in FIG. 17, the transmission line 120 may include an amplifier section 156 that includes a pair of amplifiers 158 and a pair of circulators 160. In operation, the activation energy E received by the stack antenna 148 is routed to amplifier 158a by circulator 160a. The amplified activation energy E is then routed to the conductor 132 by circulator 160b. Similarly, the tag energy T carried by the conductor 132 is routed to amplifier 158b by circulator 160b. The amplified tag energy T is then routed to the stack antenna 148 by circulator 160a. Accordingly, the amplifier section 156 enables two-way amplification of the activation energy E and the tag energy T.

Figure 18:
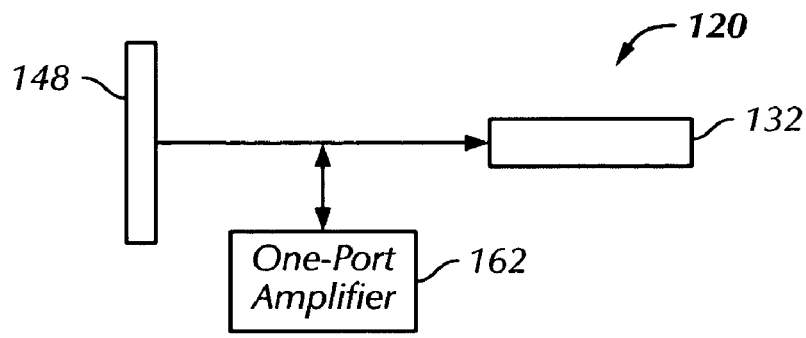
FIG. 18 is a schematic view of still another exemplary embodiment of a transmission line with an amplifier and an antenna.

In further embodiments as shown in FIG. 18, the transmission line 120 may include a one-port (or negative-resistance) amplifier 162 positioned at or near the stack antenna 148 for amplifying the activation energy E to enhance coupling between the conductor 132 and the RFID circuits 114, and for amplifying the tag energy T prior to radiation by the stack antenna 148. The one-port amplifier 162 may be formed using a diode having a response with a suitable negative resistance. Alternatively, the one-port amplifier 162 may be formed with a transistor that is biased with a suitable feedback to present a negative resistance at the point of coupling between the stack antenna 148 and the conductor 132.

For the purposes of this description, the term stack and its derivatives refer to both a vertical stack of items 104 (i.e., one item positioned on top of another item) and a horizontal stack of items 104 (i.e., side-by-side or adjacent positioning of items in a layer). In addition, the term item may be any type of item that may be desired to be read, such as a box, a container, an object, a carton, a case, a bottle, a box containing a plurality of other items, and so on. Further, the transmission line 120 may be configured as, or include, any number of transmission structures, including twin line, microstrip line, coplanar waveguide, coplanar waveguide with ground, stripline, and so on.

Those skilled in the art will understand that the preceding embodiments of the present invention provide the foundation for numerous alternatives and modifications thereto. For example, the reader 106 and the computer 108 may be integrated as a single unit for reading and processing information associated with the load 102. In addition, the tags 110 may be applied or integrated with items that have shapes other than the rectilinear box-like items illustrated herein. Further, the tags 110 may be printed directly on to the item 112. Additionally, the RFID tags 110 may be disposed on, mounted to, or integrated with any type of item that is desired to be read. These other modifications are also within the scope of the present invention. Accordingly, the present invention is not limited to that precisely as shown and described in the present invention.

What is claimed is:

1. A radio-frequency identification (RFID) system for use with a reader that transmits activation energy to read a stack of items, the system comprising:

a plurality of RFID tags each being respectively mountable to one of the items and including an RFID circuit for generating tag energy when activated; and a transmission line for carrying activation energy from the reader and tag energy from the tags;

the transmission line being positionable in coupling proximity to a plurality of the tags when the plurality of the tags are mounted to items and when the items are stacked, such that:

when carrying activation energy, the transmission line couples with and thereby enables activation of the plurality of the tags; and when the plurality of the tags are activated, the transmission line couples with and carries tag energy from the plurality of the tags.

2. The system of claim 1 wherein the transmission line is elongated such that when the items are stacked and the tags are spatially separated from each other, the transmission line is positionable in coupling proximity with a plurality of the tags.

3. The system of claim 1 wherein the transmission line is disposed on a piece of sheet material.

4. The system of claim 3 wherein the piece of sheet material is flexible.

5. The system of claim 4 wherein the piece of sheet material includes an adhesive on a surface thereof.

6. The system of claim 3 wherein the piece of sheet material includes a substantially inflexible board.

7. The system of claim 1 further comprising a stack antenna operatively coupled with the transmission line for receiving activation energy transmitted by the reader and for radiating tag energy carried by the transmission line.

8. The system of claim 7 wherein the stack antenna and the transmission line are mounted on a piece of sheet material.

9. The system of claim 7 further comprising an amplifier operatively disposed with the stack antenna and the transmission line.

10. The system of claim 7 wherein:

the stack antenna includes a receive section for receiving activation energy from the reader and a radiate section for radiating tag energy from the tags; and the transmission line includes an activation conductor operatively coupled with the receive section of the stack antenna for carrying activation energy and a tag conductor operatively coupled with the radiate section of the stack antenna for carrying tag energy.

11. The system of claim 10 further comprising a pair of amplifiers operatively and respectively disposed the sections of the stack antenna and the conductors of the transmission line.

12. The system of claim 1 wherein each of the tags includes a substrate on which the RFID circuit is disposed.

13. The system of claim 12 wherein the substrate of each of the tags includes an adhesive layer.

14. A method of reading radio-frequency identification (RFID)-enabled items, the method comprising:

providing a load of a plurality of RFID-tagged items stacked together, each of the RFID-tagged items including:

a item; and a RFID tag mounted to the item and including an RFID circuit with an antenna and a chip for generating tag energy when activated; and providing a transmission line that is configured to carry activation energy from the reader and tag energy from the tags;

positioning the transmission line in operative proximately to at least a number of the RFID tags, such that:

when carrying activation energy, the transmission line couples with and thereby enables activation of the plurality of the tags; and when the plurality of the tags are activated, the transmission line couples with and carries tag energy from the plurality of the tags.

15. The method of claim 14 further comprising transmitting activation energy to the load.

16. The method of claim 14 wherein the transmission line is disposed on a piece of sheet material, and wherein positioning the transmission line comprises:

positioning the piece of sheet material adjacent to a stack of the RFID-tagged items in the load.

17. The method of claim 14 wherein the transmission line is disposed on an elongated adhesive substrate, and wherein positioning the transmission line comprises:

adhering the substrate to a plurality of the RFID tags.

18. A method of reading a plurality radio-frequency identification (RFID) tags that are spatially separated from each other and that generate tag energy when activated by activation energy from a reader, the method comprising:

receiving activation energy from the reader;

activating the tags by carrying the activation energy on a transmission line that is positioned in coupling proximity with the tags; and carrying tag energy from the activated tags on the transmission line.

19. The method of claim 18 further comprising amplifying the activating energy received from the reader.

20. The method of claim 18 further comprising amplifying the tag energy carried on the transmission line.

* * * * *